F. CHRISTIANSEN.
DEVICE FOR CALMING WAVES.
APPLICATION FILED MAY 20, 1912.
1,035,689.
Patented Aug. 13, 1912.
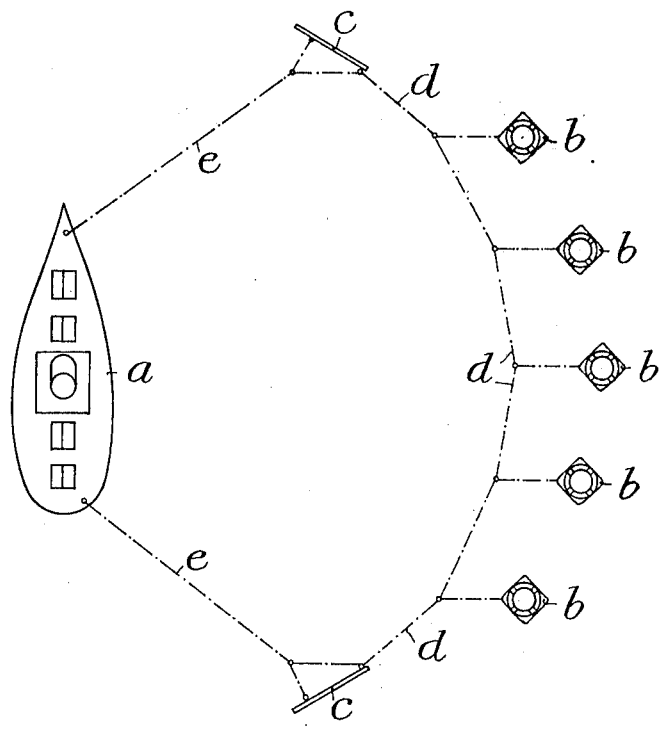
Witnesses
Inventor
Friedrich Christiansen

UNITED STATES PATENT OFFICE.

FRIEDRICH CHRISTIANSEN, OF KIEL, GERMANY.

DEVICE FOR CALMING WAVES.

1,035,689. Specification of Letters Patent. Patented Aug. 13, 1912.

Application filed May 20, 1912. Serial No. 698,468.

*To all whom it may concern:*

Be it known that I, FRIEDRICH CHRISTIANSEN, a subject of the King of Prussia, and resident of No. 20 Eckernförder Allée, Kiel, in the Empire of Germany, have invented a new and useful Improved Device for Calming Waves, of which the following is a specification.

To safeguard against shipwreckage in stormy weather and to enable the life boats to be launched in case of shipwreckage without danger of destruction by the force of the waves, the calming of the sea by using oil for suppressing the waves is most effective, if at the weather-side of the ship the largest possible area of water surface is oiled. The hitherto known wave suppressors (oil casks, oil buoys, oil life-belts, oil rockets, oil shells) enable only a very limited surface to be calmed, it having been considered impossible to systematically launch a number of these wave suppressors in such a manner, that the surfaces calmed by the individual wave suppressors border one another so that they are totalized.

According to the present invention floatable wave suppressors (preferably in the shape of life-belts, which are automatically opened for the outflow of the oil on being launched) are caused to collectively calm a very extensive area of water surface by being attached, in an appropriate number and at suitable distances apart, to a rope, which connects two sheer boards, said sheer boards being attached by tow-ropes of proper lengths at the bow and stern of the ship respectively.

Practical experiments have demonstrated the fact, that the improved arrangement of the wave suppressors attains a calming of the sea over an area large enough to safely launch the life boats even in the roughest weather.

In the annexed drawing the improved arrangement of the wave suppressors in connection with the sheer boards is shown diagrammatically.

The ship $a$ is provided with wave suppressors $b$, which in the example indicated in the drawing assume the shape of life belts adapted to be automatically opened for the outflow of the oil on being launched. The ship is further provided with two sheer boards $c$, which are connected together by a rope $d$. To this rope $d$ a suitable number of the wave suppressors $b$ are attached, either directly or indirectly, at suitable distances apart.

To apply the wave suppressors $b$ they are launched with the sheer boards $c$. By the action of the said sheer boards $c$ through their connection with the bow and stern of the ship, the rope $d$ is tensioned, thus distributing the individual wave suppressors $b$ uniformly between the two sheer boards and consequently causing the area inclosed between $c, c, d$ and $e, e$ to be effectively calmed, so that the lift boats may be safely launched.

The wave suppressors by being constructed in the shape of oil-issuing life belts offer persons swimming in the water a better chance of saving owing to their being surrounded by calmed water. These oil-issuing life belts are, besides, easier localized in the water.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claim, or of mechanical equivalents to the structure set forth.

What I do claim as my invention, and desire to secure by Letters Patent, is:

Improved device for calming waves comprising floatable oil-issuing wave suppressors (preferably in the shape of life-belts, which are automatically opened for the outflow of oil on being launched) attached, in an appropriate number and at suitable distances apart, to a rope, which connects two sheer boards, said sheer boards being attached by tow-ropes of proper lengths at the bow and stern of the ship respectively, substantially as described and shown.

In witness whereof I have hereunto signed my name this 6th day of May 1912, in the presence of two subscribing witnesses.

FRIEDRICH CHRISTIANSEN.

Witnesses:
ERNEST H. L. MUMMENHOFF,
FRANCIS R. STEWART.

---

Copies of this patent may be obtained for five cents each, by addressing the "Commissioner of Patents, Washington, D. C."